UNITED STATES PATENT OFFICE.

ALEXANDER McKECHNIE, OF BIRMINGHAM, AND FREDRIC GEORGE BEASLEY, OF SMETHWICK, BIRMINGHAM, ENGLAND.

METHOD OR PROCESS OF TREATING NICKEL-COPPER MATTES.

1,047,825. Specification of Letters Patent. Patented Dec. 17, 1912.

No Drawing. Application filed April 15, 1912. Serial No. 690,995.

*To all whom it may concern:*

Be it known that we, ALEXANDER McKECHNIE, residing at Rotton Park street, Birmingham, England, copper-smelter, and FREDRIC GEORGE BEASLEY, residing at 44 Green street, Smethwick, Birmingham, England, chemical engineer, both subjects of the King of Great Britain, have invented certain new and useful Methods or Processes of Treating Nickel-Copper Mattes, of which the following is a specification.

In the specification of our United States Patent No. 981451, we described methods of extracting nonferrous solutions from raw or calcined ores, mattes or the like containing iron, by treating the said ores or the like, in a pressure vessel with acid or ferrous solutions and subjecting the contents of the said vessel to the oxidizing action of air under the influences of high temperature and high pressure; the clear separation of the non-ferrous solutions being dependent upon the oxidation of ferrous salts (whether formed by the action of the acid on the iron present or whether contained in the solution when ferrous liquors are used) into the solvent-acting ferric state by the action of air. It has also been proposed to treat low-grade copper nickel mattes (which are "diluted" with a considerable percentage of iron as ferrous sulfid and are therefore readily soluble in dilute sulfuric acid at ordinary temperatures) by first digesting the matte with the said acid to obtain a mixed solution of the sulfates of iron, copper and nickel and a residue which contains insoluble copper sulfid, and then, by further or distinct operations, treating the mixed solution for the purpose of completing the precipitation of copper and subsequently eliminating the iron so as to obtain finally a pure solution of nickel sulfate. Proposals have also been put forward for treating bessemerized and other high-grade or concentrated mattes (which contain little or no iron) with a view to the complete extraction of their nickel content, according to which sulfid matte is digested with sulfuric acid or hydrochloric acid in open tanks; the solvent re-action (where sulfuric acid is used) being $$NiS + H_2SO_4 = NiSO_4 + H_2S,$$

while to keep the copper out of the solution, either the working is conducted under conditions which will maintain an excess of $H_2S$ in the said solution, or the latter has to be subsequently treated with $H_2S$, in order to utilize the reaction $$H_2S + CuSO_4 = CuS + H_2SO_4.$$

But in order to obtain anything approaching complete extraction by this open tank treatment, first the matte and subsequently the nickeliferous residues have to be subjected to digestion in successive baths of acid, while the fact that the operations are conducted in contact with air render it extremely difficult to prevent the formation of soluble copper salts by oxidation. Further these processes must be conducted at relatively low temperatures, as otherwise there is a tendency for the acid and sulfureted hydrogen to be driven off, which gives rise to waste of acid and is unfavorable to the utilization of the $H_2S$ for preventing the solution of copper. Indeed, our extensive experiments have proved that the digestion of concentrated or bessemerized mattes in open tanks, however worked, is so slow in its action and is subjected to so many other limitations beyond those already mentioned, that the process is incapable of being employed successfully upon a commercial scale, while as mattes of this kind contain little or no iron, they are also not adapted for treatment with acid according to the process described in the specification of our Patent No. 981451.

The object of our present invention is to provide a simple and effective method or process of treating high-grade or concentrated mattes for the purpose of effecting, on a commercial scale, and by a simple operation, the rapid and complete extraction of the entire nickel content of the said matte, with simultaneous complete exclusion or elimination of copper from the nickel solution. And this result we attain by digesting raw or partially roasted matte in a closed air-excluding vessel with sulfuric acid, hydrochloric acid or other similarly-acting acid and working the extraction under the influences of high temperature and high pressure, *i. e.*, a temperature exceeding 100° C. and a steam pressure corresponding thereto under the well known natural law. Under these conditions, the total nickel content can be rapidly and completely extracted from large quantities of the matte as under the high pressure and temperature, the solvent re-action of the acid on the nickel sulfid (for instance—when sulfuric acid is used—

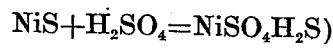

is greatly accelerated, while the sulfureted hydrogen formed by the primary re-action is utilized, to the full extent of its value as a copper-precipitating agent, for preventing the permanent formation of soluble copper by the action of the acid upon the copper which is usually present (especially in partially-roasted mattes) as soluble oxid or sulfate. And as this copper-excluding re-action

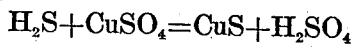

occurs simultaneously with the extraction of the nickel by the accelerated solvent action, the single operation as above described not only enables us to obtain the entire nickel content of the matte as a purified sulfate, chlorid or like solution in a minimum of time, but also yields a residue in which all the copper content is present as sulfid, i. e., both the copper sulfid originally present in that form in the matte, and also the sulfid formed and precipitated by the $H_2S$ reaction.

The process is applicable to the extraction of nickel from any composition of rich or concentrated matte in a raw or partially-roasted state (including nickel copper mattes containing a high percentage of copper, an admittedly difficult separation) and it can be worked with any convenient quantity and strength of acid, i. e., either with excess acid or with the theoretical quantity required for dealing with a given weight of matte, in which latter event, it is possible to obtain a concentrated or practicable neutral nickel solution; and since the operations are conducted in a closed vessel and with exclusion of air, there can be no waste of acid under the high working temperature nor any tendency for copper to be oxidized by air into a soluble form.

Although the process may be effectively and economically applied to the treatment of raw or unroasted high-grade mattes, we find that the best results as regards accelerated and complete extraction of the nickel are obtained by the working with matte which has been roasted to a relatively low sulfid value, since this roasting increases the porosity of the matte, and so renders it physically more susceptible to the solvent action of the acid under the high temperature and pressure, but obviously the roasting should be stopped at a stage that will leave sufficient nickel as sulfid to generate enough sulfureted hydrogen to effect the elimination of the dissolved copper. Should it, however, be found during the digestion of the charge that, due to over-roasting, the matte does not contain the necessary amount of nickel sulfid to provide for the complete elimination of the copper, this can be readily remedied by introducing into the pressure vessel, a quantity of raw or unroasted matte, which, being rich in the sulfid, will yield the necessary $H_2S$ for completing the precipitation of dissolved copper from the finished solution.

What we claim is:—

1. A process of rapidly extracting the nickel content from high-grade or concentrated copper-nickel mattes, and simultaneously eliminating or excluding copper from the nickel solution, consisting in digesting the said matte, in a raw or partially roasted state, with a suitably-acting acid in a closed air-excluding vessel, and under a temperature exceeding 100° C. and a steam pressure corresponding thereto under the natural law.

2. A process of rapidly extracting a pure nickel solution from high-grade or concentrated copper-nickel matte in a roasted state, which consists in digesting the roasted matte with a suitably acting acid in a closed air-excluding vessel and under a working temperature exceeding 100° C. and a steam pressure corresponding thereto under the natural law and adding a sufficient quantity of unroasted matte, or matte of high nickel-sulfid value, to correct any deficiency in the nickel-sulfid content of the original charge, substantially as herein described.

3. A process of rapidly extracting a pure nickel solution from high-grade or concentrated copper-nickel matte which consists in preliminarily roasting the matte to a relatively low sulfid value and in digesting the roasted matte with a suitably acting acid in a closed air-excluding vessel and under a working temperature exceeding 100° C. and a steam pressure corresponding thereto under the natural law.

In testimony whereof we have hereunto set our hands in presence of two subscribing witnesses.

ALEXANDER McKECHNIE.
FREDRIC GEORGE BEASLEY.

Witnesses:
ARTHUR SADLER,
E. J. REEVE.